United States Patent
Schlichte

(10) Patent No.: US 12,325,423 B2
(45) Date of Patent: Jun. 10, 2025

(54) METHOD FOR OPERATING A LANE CHANGE ASSISTANCE SYSTEM OF A MOTOR VEHICLE, AND LANE CHANGE ASSISTANCE SYSTEM

(71) Applicant: Volkswagen Aktiengesellschaft, Wolfsburg (DE)

(72) Inventor: Michael Schlichte, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 144 days.

(21) Appl. No.: 18/251,457

(22) PCT Filed: Nov. 1, 2021

(86) PCT No.: PCT/EP2021/080254
§ 371 (c)(1),
(2) Date: May 2, 2023

(87) PCT Pub. No.: WO2022/090532
PCT Pub. Date: May 5, 2022

(65) Prior Publication Data
US 2024/0001927 A1    Jan. 4, 2024

(30) Foreign Application Priority Data
Nov. 2, 2020  (DE) ............... 10 2020 213 726.9

(51) Int. Cl.
*B60W 30/18*  (2012.01)
*B60W 50/16*  (2020.01)
(Continued)

(52) U.S. Cl.
CPC ...... *B60W 30/18163* (2013.01); *B60W 50/16* (2013.01); *G06V 10/764* (2022.01);
(Continued)

(58) Field of Classification Search
CPC ...... B60W 10/06; B60W 10/08; B60W 10/20; B60W 30/18163; B60W 30/095;
(Continued)

(56) References Cited

U.S. PATENT DOCUMENTS 8,027,029 B2    9/2011    Lu et al. ............... 356/4.01
8,791,802 B2    7/2014    Schwindt et al. ....... 340/435
(Continued)

FOREIGN PATENT DOCUMENTS

DE    102011009665 A1    12/2011    ......... B60W 30/08
DE    102014003343 A1    9/2014    ......... B60W 30/08
(Continued)

OTHER PUBLICATIONS

German Search Report, Application No. 102020213726.9, 10 pages.
International Search Report and Written Opinion, Application No. PCT/EP2021/080254, 20 pages.

*Primary Examiner* — Hai H Huynh
*Assistant Examiner* — Johnny H Hoang
(74) *Attorney, Agent, or Firm* — Slayden Grubert Beard PLLC

(57) ABSTRACT

The disclosure relates to a method for operating a lane change assistance system, in which a detection apparatus, which is provided on a front corner of the motor vehicle, monitors an adjacent lane in front and to the side, and in which the detection apparatus detects an object on the adjacent lane and, when the detected object is evaluated by way of an electronic computing apparatus, at least one characterizing parameter of the object is determined, wherein at least one function unit detects an intention of a user of the motor vehicle to change lane and a differential speed between the motor vehicle and the object is determined as a characterizing parameter and the electronic computing apparatus generates at least one control signal for
(Continued)

at least one further function unit on the basis of the intention to change lane and the differential speed.

18 Claims, 3 Drawing Sheets

(51) Int. Cl.
  *G06V 10/764* (2022.01)
  *G06V 20/58* (2022.01)
  *B60W 50/14* (2020.01)
(52) U.S. Cl.
  CPC ....... *G06V 20/58* (2022.01); *B60W 2050/146* (2013.01); *B60W 2420/403* (2013.01); *B60W 2420/408* (2024.01); *B60W 2540/18* (2013.01); *B60W 2554/4041* (2020.02); *B60W 2554/80* (2020.02)
(58) Field of Classification Search
  CPC ......... B60W 30/0953; B60W 30/0956; B60W 50/10; B60W 50/14; B60W 50/16; B60W 2420/403; B60W 2420/408; B60W 2422/00; B60W 2540/10; B60W 2540/14; B60W 2540/18; B60W 2540/20; B60W 2050/143; B60W 2050/146; B60W 2520/10; B60W 2520/125; B60W 2520/14; B60W 2520/202; B60W 2554/4041; B60W 2554/804; B60W 2710/202; G06V 10/764; G06V 20/58; B62D 5/04; B62D 15/0255
  USPC .............. 701/41–44; 340/435, 436, 901, 903
  See application file for complete search history.

(56) References Cited

U.S. PATENT DOCUMENTS

| | | |
|---|---|---|
| 8,812,226 B2 | 8/2014 | Zeng ............................ 701/301 |
| 9,940,528 B2 | 4/2018 | Higgins-luthman |
| 10,207,712 B2 | 2/2019 | Schaper et al. |
| 10,671,076 B1 | 6/2020 | Kobilarov et al. |
| 11,022,674 B2 | 6/2021 | Takeuchi et al. |
| 11,644,834 B2* | 5/2023 | Ditty ................... G06F 15/7807 701/23 |
| 2009/0190800 A1* | 7/2009 | Takahashi .............. G06V 20/58 382/104 |
| 2011/0190972 A1 | 8/2011 | Timmons et al. ........... 701/31.4 |
| 2011/0313665 A1 | 12/2011 | Lueke et al. .................. 701/301 |
| 2017/0151982 A1 | 6/2017 | Fujii et al. ....................... 701/41 |
| 2018/0178802 A1 | 6/2018 | Miyata |
| 2019/0086511 A1* | 3/2019 | Takeuchi .............. G01S 7/0235 |
| 2020/0010082 A1* | 1/2020 | Matsunaga ....... B60W 30/0953 |
| 2023/0234574 A1* | 7/2023 | Funabashi ......... B60W 30/0956 701/301 |
| 2023/0234575 A1* | 7/2023 | Iwase ................ B60W 30/0956 701/301 |
| 2023/0351895 A1* | 11/2023 | Kadowaki ............ B60W 50/16 |

FOREIGN PATENT DOCUMENTS

| | | | |
|---|---|---|---|
| DE | 102015221911 A1 | 5/2017 | ............ B60W 30/08 |
| DE | 102018122851 A1 | 3/2019 | ............. G01S 13/87 |
| DE | 102017219813 A1 | 5/2019 | ............ B60W 30/08 |
| DE | 102018120942 A1 | 3/2020 | ............ B60W 30/08 |
| DE | 102018217746 A1 | 4/2020 | ............ B60W 30/08 |
| DE | 102020213726 A1 | 5/2022 | ............ B60W 30/08 |
| EP | 2042399 A2 | 4/2009 | ............... B60R 1/00 |
| WO | 2022/090532 A1 | 5/2022 | ............ B60W 30/08 |

* cited by examiner

METHOD FOR OPERATING A LANE CHANGE ASSISTANCE SYSTEM OF A MOTOR VEHICLE, AND LANE CHANGE ASSISTANCE SYSTEM

CROSS-REFERENCE TO RELATED APPLICATIONS

This application claims priority to German Patent Application No. DE 10 2020 213 726.9, filed on Nov. 2, 2020 with the German Patent and Trademark Office. The contents of the aforesaid Patent Application are incorporated herein for all purposes.

TECHNICAL FIELD

The disclosure relates to a method for operating a lane change assistance system of a motor vehicle, in which a detection apparatus of the lane change assistance system which is provided on a front corner of the motor vehicle monitors an adjacent lane located in front and to the side of a lane on which the motor vehicle is located, and in which the detection apparatus detects an object on the adjacent lane, wherein the object is detected in front and to the side and, when the detected object is evaluated by way of an electronic computing apparatus, at least one characterizing parameter of the object is determined. The disclosure further relates to a lane change assistance system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

It is known that neighboring lanes are only visible to a driver or, alternatively, user of a motor vehicle to a limited extent when there is a lot of traffic and when traveling behind a vehicle in front. In particular, for example in the case of highway exits, for example when traveling behind a truck, said highway exit cannot be seen easily. If motor vehicles that are traveling slowly or stationary are located on the neighboring lane, there is the risk of a collision in the event of a lane change at high speed. The same applies, for example, to passing maneuvers on rural roads when an oncoming motor vehicle cannot be perceived by the driver.

Known systems relate to assistance during a lane change for classic passing maneuvers, in which motor vehicles in the direction of travel are involved. Furthermore, known systems relate to traffic traveling behind.

SUMMARY

A need exists to provide a method and a lane change assistance system by means of which a safe lane change to a neighboring lane is made possible.

The need is addressed by a method and a lane change assistance system according to the independent claims. Various embodiments are presented in the dependent claims, the following description, and the drawings.

DESCRIPTION

Figure 1:
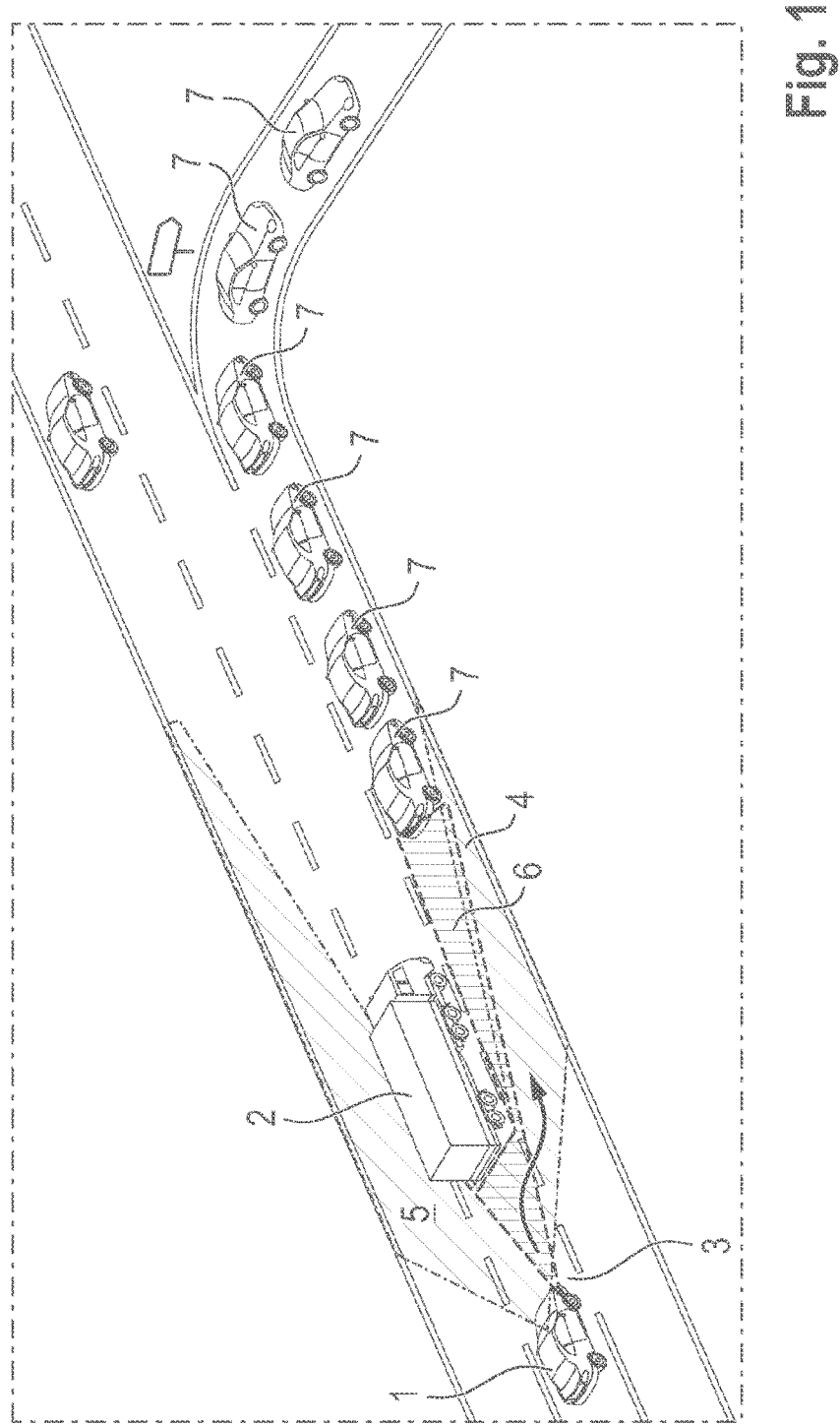
FIG. 1 is a schematic perspective view of an embodiment of a motor vehicle comprising an embodiment of a lane change assistance system in a turn-off situation.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

One example aspect relates to a method for operating a lane change assistance system of a motor vehicle, in which a detection apparatus of the lane change assistance system which is provided on a front corner of the motor vehicle monitors an adjacent lane located in front and to the side of a lane on which the motor vehicle is located, and in which the detection apparatus detects an object on the adjacent lane, wherein the object is detected in front and to the side and, when the detected object is evaluated by way of an electronic computing apparatus, at least one characterizing parameter of the object is determined.

It is provided that at least one function unit of the lane change assistance system detects an intention of a user of the motor vehicle to change lane and a differential speed between the motor vehicle and the object is determined as a characterizing parameter and the electronic computing apparatus generates at least one control signal for at least one further function unit of the lane change assistance system on the basis of the intention to change lane and the differential speed.

This makes it possible to offer protection against stationary, relatively slow, or oncoming motor vehicles on the adjacent lane, which may also be referred to as the neighboring lane. A safe lane change of the motor vehicle is thus made possible.

The motor vehicle may be an at least partially autonomous motor vehicle. In other words, the lane change assistance system can intervene in a driving dynamics function unit of the motor vehicle, for example for longitudinal acceleration or transverse acceleration.

A vehicle front corner sensor system having an electronic computing apparatus is proposed, in which an occupancy can be checked for the adjacent lane by means of a situation evaluation before a lane change takes place and, if the neighboring lane is occupied, the corresponding differential speed is evaluated and it is determined whether the object poses a danger for the current change of lane.

By using the front corner sensor system, a user of the motor vehicle who is, in particular, a vehicle driver of the motor vehicle is given the opportunity to react to slow obstacles. In addition, the motor vehicle may act in a protective manner for the driver in the case of stationary/slow/oncoming objects that are not yet visible to the user themselves.

In other words, it is provided that the detection apparatus detects objects on the neighboring travel lane and an environment model is created. Said environment model and the intention to change lane are input data for the electronic computing apparatus, in which a situation evaluation is performed in the event of a lane change and in the event of an identified high differential speed. A warning may then be generated for the user, for example.

In some embodiments, a warning signal is generated as the control signal for a warning apparatus as a further function unit. The warning apparatus may, for example, be a display apparatus, such that an optical warning signal can be displayed on the display apparatus for the user of the motor vehicle. Furthermore, an acoustic warning signal may also be generated. Furthermore, it is possible that, for example, haptic feedback is generated on a steering wheel apparatus as the warning signal, such that the user is warned prior to the lane change that a, for example slow, object is located on the neighboring lane.

It is also beneficial if a driving dynamics control signal is generated as the control signal for a driving dynamics apparatus as the further function unit. Therefore, it is possible to intervene in the driving dynamics of the vehicle if it is determined, for example, that the motor vehicle is moving very fast toward the object. This makes it possible to prevent a critical situation in road traffic.

Furthermore, it is beneficial if a braking apparatus and/or a steering apparatus is controlled as the driving dynamics apparatus. For example, the braking apparatus can already be prepared for heavy braking in the future. The steering apparatus may generate an additional indication in that, for example, steering in the direction of the adjacent lane is made more difficult, such that the driver can be alerted of the occupied lane in a haptic manner.

In some embodiments, the object is additionally classified and the classification is taken into account when the control signal is generated. For example, it can be provided that the object is identified as a motor vehicle or as a motorcycle or as a truck. In particular, these objects have different driving dynamics properties that can then be taken into account as well. In particular, the type of object is thus taken into account when the control signal is generated.

In some embodiments, the object is additionally evaluated with regard to a size of the object and/or a position of the object and/or a direction vector of the object and this evaluation is taken into account when the control signal is generated. It is thus possible to draw conclusions on the movement dynamics of the object, as a result of which a reliable evaluation of the object can be achieved. This evaluation can then in turn have an influence on the control signal, such that a rear-end collision can be reliably prevented.

Furthermore, it has proven beneficial if the detected object is detected by means of at least one first detection apparatus and a second detection apparatus that is designed differently to the first detection apparatus and if the respectively detected object is fused by means of the electronic computing apparatus and the characterizing parameter is determined based thereon. In particular, different properties of the different detection apparatus can thus be used to reliably determine the object. For example, the object can also be reliably detected by means of a lidar sensor apparatus at great distances. The movement of the object can be reliably detected by means of a radar apparatus. On account of the fusing, a beneficial evaluation of the object can thus be achieved, as a result of which the lane change can be performed in a reliable manner.

In some embodiments, the intention to change lane is detected based on a detected steering angle of the motor vehicle at a steering wheel apparatus as the function unit and/or an actuation of a turn signal lever as the function unit and/or a planned route within a navigation apparatus as the function unit. Therefore, the lane change can be reliably recognized at an early time, and therefore the evaluation of the object on the neighboring lane can be performed. As a result, incorrect interventions in the further function unit can be prevented.

It is also beneficial if a lidar sensor apparatus and/or a radar sensor apparatus and/or an ultrasound sensor apparatus and/or a camera is provided as the at least one detection apparatus. In particular, the above-mentioned detection apparatuses are already installed on the motor vehicle. In particular, said already installed detection apparatuses can be used to detect the object and/or to monitor the adjacent travel lane. They are, in particular, already established detection apparatuses on the motor vehicle, such that a reliable evaluation can be performed.

The method described is, in particular, a computer-implemented method. In particular, in this regard, the disclosure may relate to another aspect, namely a computer program product comprising commands that cause the method according to the preceding to be carried out when the computer program product is executed on a computer-readable storage medium of an electronic computing apparatus. The present teachings therefore also relate to a computer-readable storage medium comprising the corresponding computer program product.

Another example aspect relates to a lane change assistance system for a motor vehicle comprising at least one detection apparatus, an electronic computing apparatus, a function unit, and a further function unit, wherein the lane change assistance system is designed to carry out a method according to the teachings herein. In particular, the method is carried out by means of the lane change assistance system.

Another example aspect relates to a motor vehicle comprising a lane change assistance system according to the teachings herein. The motor vehicle is designed to be at least partially autonomous.

Embodiments of the lane change assistance system are conceivable that have features which have already been described in conjunction with the embodiments of the method according to the teachings herein. For this reason, the corresponding embodiments of the lane keeping assistance system are not described again.

The teachings herein also include combinations of the features of the described embodiments.

In the following, further exemplary embodiments are described. Elements having the same functions are, in each case, provided with the same reference signs in the FIGS.

In the embodiments described herein, the described components of the embodiments each represent individual features that are to be considered independent of one another, in the combination as shown or described, and in combinations other than shown or described. In addition, the described embodiments can also be supplemented by features other than those described.

FIG. 1 shows a motor vehicle 1 in a driving situation in which the motor vehicle 1 would like to turn off. In the present case, the motor vehicle 1 is located behind a truck 2. Furthermore, the motor vehicle 1 is located on a lane 3. In the present exemplary embodiment, an adjacent lane 4 is shown which is depicted, in particular, as an exit of a highway. A visible region 5 and a non-visible region 6 that is covered by the truck 2 are shown from the motor vehicle 1. A large number of objects 7 are located on the adjacent lane 4. In the present case, the objects 7 are depicted as motor vehicles that are in a kind of traffic jam. In other words, if the motor vehicle 1 were to perform a lane change onto the adjacent lane 4, it could collide with the object 7 moving slowly, since, in particular, said object is in the non-visible region 6.

Figure 2:
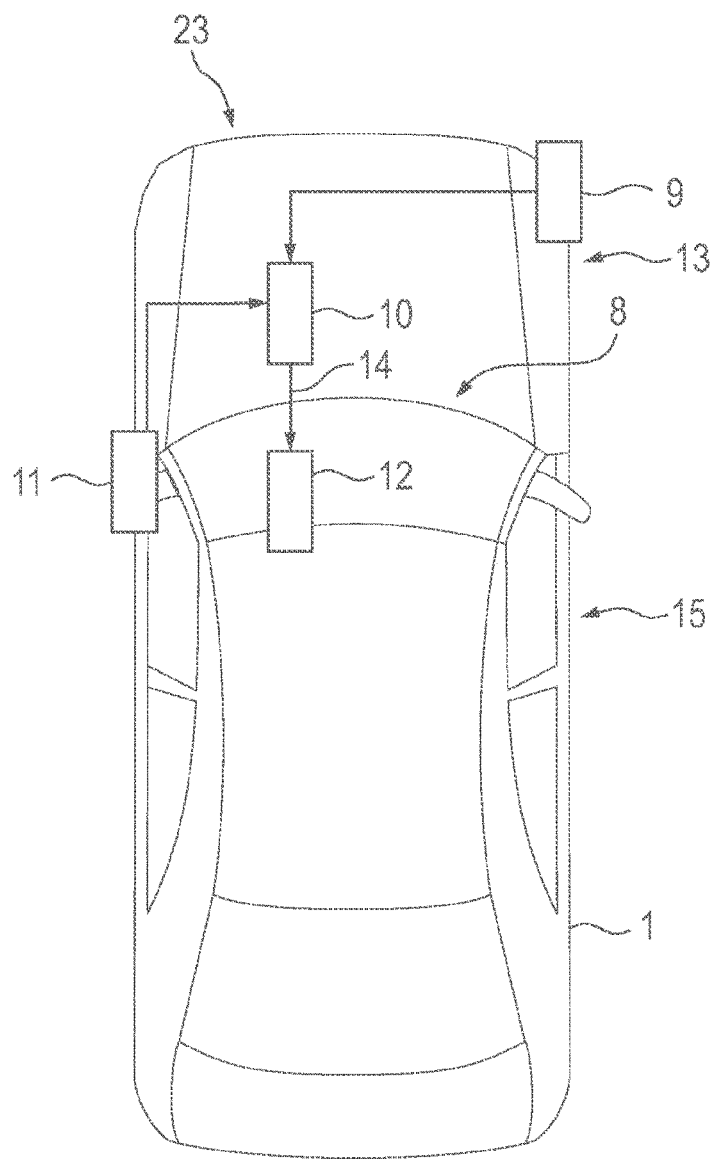
FIG. 2 is a schematic plan view of an embodiment of a motor vehicle comprising an embodiment of an assistance system.

FIG. 2 is a schematic plan view of a first embodiment of the motor vehicle 1 comprising an embodiment of a lane change assistance system 8. In the following exemplary embodiment, the lane change assistance system 8 comprises at least one detection apparatus 9, an electronic computing apparatus 10, a function unit 11, and a further function unit 12.

In the method for operating the lane change assistance system 8 of the motor vehicle 1, the detection apparatus 9 of the lane change assistance system 8, which is provided in a front corner 13 of the motor vehicle 1, monitors an adjacent lane 4 located in front and to the side of a lane 3 on which the motor vehicle 1 is located, and the detection apparatus 9 detects the object 7 on the adjacent lane 4, wherein the object 7 is detected in front and to the side and, when the detected object 7 is evaluated by way of an electronic computing apparatus 10 of the lane change assistance system 8, at least one characterizing parameter of the object 7 is determined.

It is provided that at least one function unit 11 of the lane change assistance system 1 detects an intention of a user (not shown) of the motor vehicle 1 to change lane and a differential speed between the motor vehicle 1 and the object 7 is determined as a characterizing parameter and the electronic computing apparatus 10 generates at least one control signal 14 for at least the further function unit 12 of the lane change assistance system 1.

In the following exemplary embodiment, the detection apparatus 9 is formed, in particular, on a front right corner of the motor vehicle 1. Therefore, a right-hand adjacent lane 4, in particular, can be monitored.

In the present exemplary embodiment, the further function unit 12 is designed, for example, as a warning apparatus. Therefore, in particular, a warning signal for the warning apparatus can be output as the control signal 14. The warning apparatus may be both an optical warning apparatus and an acoustic warning apparatus. Furthermore, the warning apparatus may be a haptic warning apparatus.

In particular, a so-called basic variant is shown in FIG. 2. The detection apparatus 9, which can also be referred to as a front corner sensor, is in particular formed on a passenger side 15 of the motor vehicle 1 and is coupled to the electronic computing apparatus 10, which performs a situation evaluation, in particular. In the present exemplary embodiment, the intention to change lane can be detected based on a detected steering angle of the motor vehicle 1 at a steering wheel apparatus as the function unit 11 and/or an actuation of a turn signal lever as the function unit 11 and/or a planned route within a navigation apparatus as the function unit 11. In the present case, the function unit 11 may, for example, relate to a turn signal lever. The detected object 7 is immediately checked with regard to the differential speed and a warning can be displayed in the event of a desire to change lane.

As an additional variant, the single front corner sensor on the passenger side 15 may be designed with the steering angle control unit and the warning indicator. The detected objects 7 are immediately checked with regard to the differential speed and a warning about the lane change is displayed. In particular, it is provided that steering wheel intervention or a steering wheel warning is only carried out in the event of a recognized desire to change lane.

In the present case, the at least one detection apparatus 9 may be a lidar sensor apparatus and/or a radar sensor apparatus and/or an ultrasound sensor apparatus and/or a camera. It may be further provided that the object 7 is additionally classified and the classification is taken into account when the control signal 14 is generated. In addition, the object 7 can additionally be evaluated with regard to a size of the object 7 and/or a position of the object 7 and/or the direction vector of the object 7 and this evaluation can be taken into account when the control signal 14 is generated.

Figure 3:
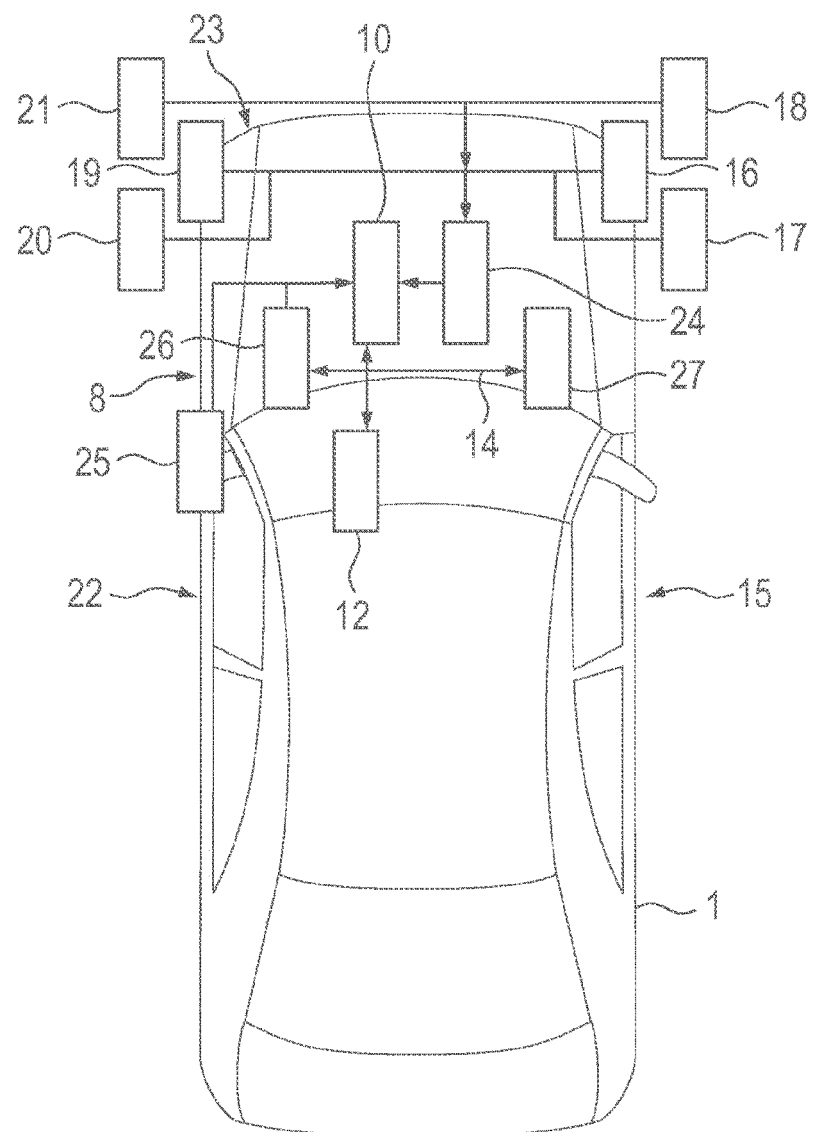
FIG. 3 is another schematic plan view of another embodiment of a motor vehicle comprising an embodiment of a lane change assistance system.

FIG. 3 is another schematic plan view of another embodiment of a motor vehicle 1 comprising the lane change assistance system 8. The following exemplary embodiment relates to an example variant of the lane change assistance system 8. In the present exemplary embodiment, the lane change assistance system 8 comprises a first radar sensor apparatus 16 on the passenger side 15. Furthermore, the lane change assistance system 8 comprises a first camera 17 and a first lidar sensor apparatus 18. The lane change assistance system 8 further comprises a second radar sensor apparatus 19, a second camera 20, and a second lidar sensor apparatus 21, which is formed on a driver side 22 of the motor vehicle 1. In particular, the above-mentioned detection apparatuses are formed on a front side 23 of the motor vehicle 1.

The data of the radar sensor apparatuses 16, 19, of the cameras 17, 20, and of the lidar sensor apparatuses 18, 21 are fused during a data fusion 24 and provided to the electronic computing apparatus 10 for evaluation. The electronic computing apparatus 10 may also receive corresponding information from a turn signal lever control unit 25, from a steering angle or, alternatively, steering wheel control unit 26, and from a brake control unit 27, which information is also evaluated. The control signal 14 can then be output by the electronic computing apparatus 10 to the warning apparatus, for example, which in the present case is depicted as the further function unit 12. Furthermore, intervention in the brake control unit 27 and in the steering angle/steering wheel control unit 26 is possible.

In particular, FIG. 3 shows that the object 7 is detected by means of at least one first detection apparatus and by means of a second detection apparatus that is designed differently to the first detection apparatus and the respectively detected object 7 is fused by means of the electronic computing apparatus 10 and the characterizing parameter is determined based thereon.

Furthermore, it is in particular shown that a driving dynamics control signal is generated as the control signal 14 for a driving dynamics apparatus as the further function unit 12 and/or a braking apparatus and/or a steering apparatus is controlled as the driving dynamics apparatus. In the present case, the braking apparatus is described, in particular, via the brake control unit 27, and the steering apparatus is described, in particular, via the steering angle/steering wheel control unit 26.

In particular, a vehicle front corner sensor system is thus described which uses the data fusion apparatus 24 to feed the corresponding sensor data to the electronic computing apparatus 10 for situation evaluation when multiple sensors are used. Furthermore, the turn signal lever control unit 25, a display for the evaluation results for the driver, a display for any available camera images for the driver, a control unit for preparing and initiating a braking procedure, and a control unit for influencing the vehicle steering angle or, alternatively, vehicle steering wheel and for measuring the steering angle are proposed. The objects 7 on the neighboring travel lane detected by means of the sensor system can then be evaluated with regard to the differential speed. In the case of multiple sensors, the sensor data are accordingly fused into a common environment model. The environment model, the turn signal lever position, and the steering angle are in each case input data of the situation evaluation. Depending on the situation evaluation, a warning is displayed to the driver in the event of an intention to change lane and a high differential speed, for example in the case of slow, stationary or, alternatively, oncoming objects 7. The brakes can be prepared and actuated. Steering can be made more difficult for the driver as an additional indication and can be influenced so as to prevent an accident.

The front corner sensor system therefore makes it possible for the vehicle driver to react to obstacles that are not visible to them. In addition, the motor vehicle 1 may act in a protective manner for the driver in the case of stationary/slow/oncoming objects 7 that are not yet visible to the driver.

In the exemplary embodiment according to FIG. 3, multiple measuring principles are combined in order to increase the safety: the radar sensor apparatuses, 16, 19, the lidar sensor apparatuses 18, 21, and the image processing of the cameras 17, 20. The sensor set used is installed in each case on the right and left of the front of the motor vehicle 1. The sensors detect the objects 7 on the neighboring lanes. The type, size, position, speed, and direction vector of the objects 7 are estimated during the detection. The objects 7 are combined into a common environment model for the relevant neighboring lane by means of sensor data fusion. The steering angle, the turn signal lever status, and the environment model are assessed by means of the situation evaluation.

In the event of a possible collision with the object 7 or even solely on account of the presence of the object 7 on the relevant neighboring lane, the situation evaluation can decide whether only a warning is output to the driver, whether the camera image is displayed to the driver for a better assessment of the situation, wherein this may always be carried out or may only ever be displayed in the event of a lane change, or for example the brakes are prepared for a possible emergency braking procedure by the driver. Furthermore, the brakes can be actuated in an automated manner in order to prevent an accident or in order to reduce the severity of the accident. The steering angle can also be influenced in order to prevent an accident or to reduce the severity of the accident. Furthermore, the steering wheel can be made more difficult to actuate or be made to vibrate in order to warn the driver, thus providing an indication to the driver.

The use of multiple measuring principles increases the probability of critical objects 7 being detected in a timely manner. The use of multiple measuring principles further provides for improved verification of objects 7 in the sensor data fusion. The sensor set on the left-hand side of the motor vehicle 1, for example in the case of right-hand traffic, is used, for example in the event of passing maneuvers on the opposing lane. The type and size of the detected objects 7 support the situation evaluation. It may be possible to drive over small objects 7, and motorcycles have a different movement behavior to a truck. The turn signal lever status is used for recognizing the intention to change lane. The steering angle is used for recognizing the lane change that is already taking place and for verifying the turn signal lever status. In particular when the turn signal lever has not been activated, the steering angle is relevant for preventing an accident in the event of a lane change.

In particular, the variants shown can in each case be combined with one another in a flexible manner.

In particular, FIG. 3 shows a specific lane change assistance system 8 which increases the probability of identifying critical objects 7 in a timely manner. Connected to the brake control unit 27, the entire embodiment can intervene and/or provide a warning in order to protect the driver in an improved manner depending on the situation.

LIST OF REFERENCE NUMERALS

1 Motor vehicle
2 Truck
3 Lane
4 Adjacent lane
5 Visible region
6 Non-visible region
7 Object
8 Lane change assistance system
9 Detection apparatus
10 Electronic computing apparatus
11 Function unit
12 Further function unit
13 Corner
14 Control signal
15 Passenger side
16 First radar sensor apparatus
17 First camera
18 First lidar sensor apparatus
19 Second radar sensor apparatus
20 Second camera
21 Second lidar sensor apparatus
22 Driver side
23 Front
24 Sensor fusion
25 Turn signal lever control unit
26 Steering angle/steering wheel control unit
27 Brake control unit The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a lane change assistance system of a motor vehicle, comprising:
monitoring, by a detector of the lane change assistance system, which is provided in a front corner of the motor vehicle, an adjacent lane located in front and to the side of a lane on which the motor vehicle is located and detecting an object on the adjacent lane;

determining, using a processor of the lane change assistance system, at least one characterizing parameter of the object when evaluating the detected object;

detecting, using a function unit of the lane change assistance system, an intention of a user of the motor vehicle to change lane and determining a differential speed between the motor vehicle and the object as a characterizing parameter; and generating, by the processor of the lane change assistance system, at least one control signal for at least one further function unit of the lane change assistance system on the basis of the intention to change lane and the differential speed; wherein the object is additionally classified, and the classification is taken into account when the control signal is generated, and wherein different driving dynamic properties of the classified object are taken into account and thus the type of object is taken into account when generating the control signal.

2. The method of claim 1, wherein a warning signal is generated as the control signal for a warning apparatus as the further function unit.

3. The method of claim 2, wherein a driving dynamics control signal is generated as the control signal for a driving dynamics apparatus as the further function unit.

4. The method of claim 3, wherein a braking apparatus and/or a steering apparatus is controlled as the driving dynamics apparatus.

5. The method of claim 2, wherein the object is additionally classified and the classification is taken into account when the control signal is generated.

6. The method of claim 2, wherein the object can additionally be evaluated with regard to a size of the object and/or a position of the object and/or direction vector of the object and this evaluation can be taken into account when the control signal is generated.

7. The method of claim 2, wherein the object is detected by means of at least one first detector and by means of a second detector that is designed differently to the first detector and the respectively detected object is fused by means of the electronic computing apparatus and the characterizing parameter is determined based thereon.

8. The method of claim 1, wherein a driving dynamics control signal is generated as the control signal for a driving dynamics apparatus as the further function unit.

9. The method of claim 8, wherein a braking apparatus and/or a steering apparatus is controlled as the driving dynamics apparatus.

10. The method of claim 9, wherein the object is additionally classified and the classification is taken into account when the control signal is generated.

11. The method of claim 9, wherein the object can additionally be evaluated with regard to a size of the object and/or a position of the object and/or direction vector of the object and this evaluation can be taken into account when the control signal is generated.

12. The method of claim 8, wherein the object is additionally classified and the classification is taken into account when the control signal is generated.

13. The method of claim 8, wherein the object can additionally be evaluated with regard to a size of the object and/or a position of the object and/or direction vector of the object and this evaluation can be taken into account when the control signal is generated.

14. The method of claim 1, wherein the object can additionally be evaluated with regard to a size of the object and/or a position of the object and/or direction vector of the object and this evaluation can be taken into account when the control signal is generated.

15. The method of claim 1, wherein the object is detected by means of at least one first detector and by means of a second detector that is designed differently to the first detector and the respectively detected object is fused by means of the processor and the characterizing parameter is determined based thereon.

16. The method of claim 1, wherein the intention to change lane is detected based on a detected steering angle of the motor vehicle at a steering wheel apparatus as the function unit and/or an actuation of a turn signal lever as the function unit and/or a planned route within a navigation apparatus as the function unit.

17. The method of claim 1, wherein a lidar sensor apparatus and/or a radar sensor apparatus and/or an ultrasound sensor apparatus and/or a camera is provided as the at least one detection apparatus.

18. A lane change assistance system for a motor vehicle, comprising: at least one detector, a processor, a function unit, and a further function unit, wherein the lane change assistance system is configured to:

monitor, by the detector, which is provided in a front corner of the motor vehicle, an adjacent lane located in front and to the side of a lane on which the motor vehicle is located and detect an object on the adjacent lane;

determine, using the processor, at least one characterizing parameter of the object when evaluating the detected object;

detect, using the function unit, an intention of a user of the motor vehicle to change lane and determine a differential speed between the motor vehicle and the object as a characterizing parameter; and to generate, by the processor, at least one control signal for the further function unit on the basis of the intention to change lane and the differential speed; wherein the object is additionally classified, and the classification is taken into account when the control signal is generated; and wherein different driving dynamic properties of the classified object are taken into account and thus the type of object is taken into account when generating the control signal.

* * * * *